United States Patent [19]
LeBlanc, Jr.

[11] 3,823,831
[45] July 16, 1974

[54] STRAINER DEVICE FOR LIQUIDS

[76] Inventor: Henry P. LeBlanc, Jr., 1201 Transcontinental Dr., Jefferson Parish, La. 70001

[22] Filed: Nov. 19, 1971

[21] Appl. No.: 200,495

[52] U.S. Cl. .................. 210/408, 210/409;414;429
[51] Int. Cl. ............................................ B01d 35/02
[58] Field of Search .......... 210/392, 393, 397, 408, 210/411, 413–415, 418, 425, 429

[56] References Cited
UNITED STATES PATENTS

| | | | |
|---|---|---|---|
| 784,170 | 3/1905 | Miller | 210/391 |
| 1,088,593 | 2/1914 | King | 210/430 X |
| 1,977,601 | 6/1932 | Winton | 210/411 |
| 3,256,995 | 6/1966 | Schmid et al. | 210/411 |
| 3,635,348 | 1/1972 | Carr | 210/413 X |

*Primary Examiner*—Frank A. Spear, Jr.
*Assistant Examiner*—Robert H. Spitzer
*Attorney, Agent, or Firm*—Pugh & Laiche

[57] ABSTRACT

The present invention is concerned with an improved straining device for separating solid materials from a fluid stream. More specifically, the present invention relates to an in-line strainer or filter for removing solid material from a fluid stream without interrupting the fluid flow and during which operation the strainer element can be back flushed without blowing the system down. The present strainer device basically comprises a ball shaped strainer element rotatably mounted within a strainer body, the strainer element being provided with an inlet into which the debris containing fluid is directed whereby the debris is continuously collected within the ball shaped strainer element. Screen closure means are provided within the strainer element whereby its inlet can be closed off to retainc the debris within the strainer element which is back flushed by rotation thereof during which time the fluid stream is continued to be strained. Clean out means are provided in conjunction with the ball shaped strainer element whereby the debris therein can be collected in a sump reservoir without blowing the system down, after which the ball shaped strainer element is returned to its normal straining position.

8 Claims, 9 Drawing Figures

PATENTED JUL 16 1974

INVENTOR.
HENRY P. LEBLANC, JR.

BY *[signature]*

ATTORNEYS

INVENTOR.
HENRY P. LEBLANC, JR.
BY
ATTORNEYS

STRAINER DEVICE FOR LIQUIDS

BACKGROUND OF THE INVENTION

The present invention pertains to those arts concerned with straining or filtering devices for separating solid materials from a fluid stream.

In many applications where it is necessary to separate a solid material from a fluid stream, it is mandatory that the fluid stream not be interrupted. That is, the straining must be effected continuously. In certain designs of strainers, this is accomplished by blowing the strainer element down during operation. This practice not only results in pressure drops occurring in the system which are quite often undesirable, but additionally causes pollution by virtue of the effluent stream which must be disposed of. To avoid these problems, self-cleaning strainers have been developed whereby the strainer element can be periodically cleaned without interrupting flow through the strainer and without requiring any extensive amount of blow down. Such devices generally consist of some form of strainer element which is provided with a strainer scraper whereby the debris collected on the walls of the strainer can be scraped therefrom and collected in a sump from which it is subsequently removed from the system on a continuous basis and generally without requiring any material pressure drop in the system. These self-cleaning strainers are generally characterized as having a relatively low open area ratio which is defined as the ratio of the area of the pipe or conduit serving the strainer to the area of the open screen surface of the strainer.

Another approach taken to avoid the above prior art problems, is to utilize a dual strainer system whereby at least two strainers are provided in parallel operation. In such an arrangement, one of the strainers can be shut down for maintenance while the other strainer is on the line. Needless to say, this arrangement is expensive since it duplicates installation costs.

Another very common limitation of most prior art strainers or filters is that due to the pressure drop across the device as the result of turbulence whereby increased friction loss is caused by the fluid flow having to assume a circumventuous path therethrough. In other words, most prior art strainers do not allow straight through flow and hence induce a pressure loss in the system.

The prior art is replete with various different strainers or filters which clearly illustrate the above discussed limitations. A very commonly employed strainer is that known as a "Y" type strainer, e.g. see U.S. Pat. No. 755,352. Such a strainer generally comprises a Y-shaped body portion which is adapted to be connected in-line. The strainer element is mounted within the side outlet portion whereby a fluid entering the body of the strainer is diverted diagonally into the inside of the strainer from which it flows through its perforated side wall and thence downstream. Means are generally provided on the side outlet portion of the Y-shaped body for either removing the strainer for cleaning or blowing the strainer down whereby solid material collected within the strainer body is flushed from the strainer. These types of strainers are characterized as having a relatively small open area ratio, generally less than four-to-one due to their relatively small screen area. The problems of having to shut the system down for cleaning of the strainer element or blowing the strainer down with the resultant pressure drop and effluent problem are evident.

Another very commonly employed strainer is that known as a basket strainer as shown in U.S. Pat. No. 2,982,413. Such strainers generally comprise an elongated body portion operably fitted perpendicularly in a conduit and which is also provided with an access cover plate for access to a basket strainer element which bayonets into the elongated body portion. Fluid flow is allowed to enter one side of the latter in open communication with the inside of the basket strainer through which the fluid flows through the perforated side walls of the strainer exteriorly of the strainer body. While this type of strainer generally has a greater open area ratio, usually four-to-one and above, their overall design is characterized as being somewhat bulky and in any event, they are generally not suitable for continuous operation since fluid flow must be interrupted and the system pressure dropped to atomspheric pressure in order to allow the cleaning of the basket. Otherwise, for continuous operation, a dual strainer arrangement would be required. However, in any event, relatively considerable pressure drop across the strainer is realized due to the tortuous fluid flow path of fluid through the device.

Improvements made in the art to avoid the problem of having to remove the strainer element for cleaning as well as prevent interruption of fluid flow and pressure drop have been by the use of such systems as that shown in U.S. Pat. No. 3,530,993. That patent discloses a strainer valve wherein the strainer element can be backflushed without disassembly of the strainer. However, as shown in FIG. 4 thereof, a dual strainer system is required for continuous operation. That design, as is evident, does not avoid the problem of pressure drop across the strainer during operation.

Improvements in the art directed at self-cleaning strainers have been as shown in U.S. Pat. Nos. 2,408,741 and 3,286,843 whereby debris collected by the strainer element can be continually removed from the system without interrupting fluid flow. However, it can be appreciated that the open area ratios of such devices are relatively small and further, that they induce relatively considerable pressure drop in the system during operation.

Among the distinct features and advantages of the present invention is not only the provision of a single strainer design which avoids or greatly minimizes the above problems inherent in the prior art, but additionally, the present invention provides a strainer design having a very large open area ratio and superior structural strength. These and further advantages of the present invention will be evident as the discussion proceeds.

SUMMARY

Figure 1:
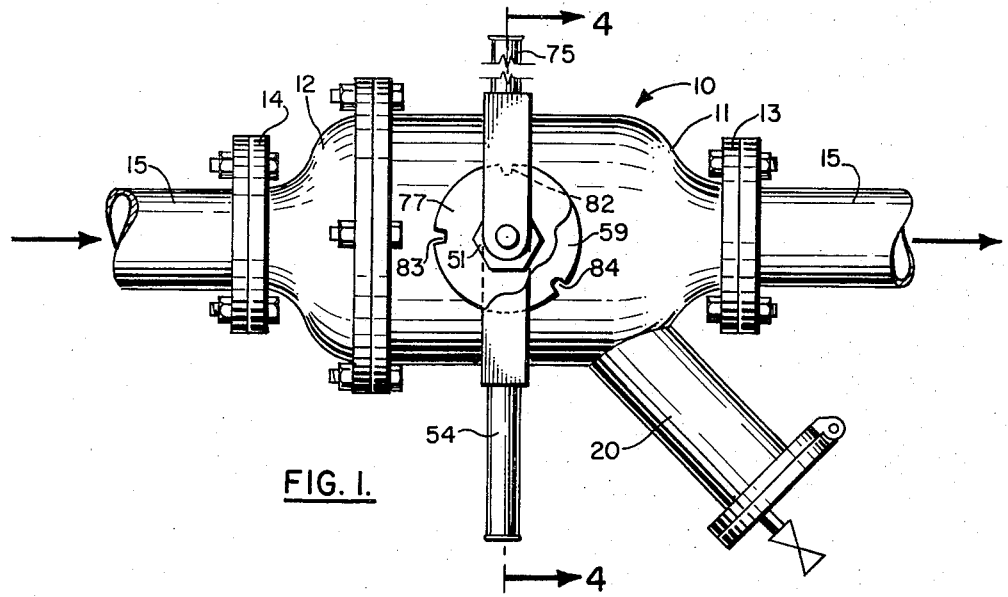
FIG. 1 in the drawing depicts a side elevation view of the present invention with the swinging screen index plate shown partly cut away to bear certain details of the strainer element index plate.

The present invention provides a liquid straining device which basically comprises main strainer body means which includes a debris chamber portion wherein debris is collected from time to time and ultimately discharged from the strainer during its normal operation without interruption of fluid flow therethrough. This is accomplished by foraminous ball shaped strainer means rotatably positioned within the strainer body and which is provided with a fluid inlet port through which fluid containing particles to be separated therefrom flows into the strainer and out through its foraminous side walls, thereby entrapping the particles within the strainer which particles are ultimately discharged into the chamber portion of the strainer body in the mode of operation described below. The strainer includes a solid area of a size and configuration sufficient to fit over and close off the debris chamber during the normal operating position of the strainer within the strainer body. Swinging screen means rotatably positioned within the strainer means are also provided for closing off the strainer inlet port while in the process of removing debris from the strainer. This is accomplished by swinging the screen means into a position covering the inlet strainer port and thereupon rotating the entire strainer and screen assembly around into a position whereby the strainer inlet port is in alignment with the debris chamber of the strainer body. During such time, the debris located within the strainer is thereby totally enclosed and consequently is prevented from being discharged therefrom. Moreover, during such operation, fluid flow through the strainer is not interrupted since the strainer element is foraminous over its entire peripheral surface with the exception of the before-defined solid area. The strainer ball screen can be rotated several 360° revolutions to effect total backwashing with scrubbing prior to dumping the debris.

Debris is removed from the ball strainer upon aligning the inlet port of the strainer, over which the screen means is positioned, with the inlet to the debris chamber, and thereafter swinging the screen out of position allowing debris collected within the strainer to be discharged into the debris chamber. Thereafter, the screen is swung back into position over the inlet port and the entire assembly returned to its former normal operating position whereby the inlet port faces in an upstream position. Following this sequence, the screen is thereupon swung out of position covering the inlet port and the valve continues to operate as previously described. Actuating means are provided for positioning both the strainer and screen elements.

Preferred embodiments are directed to specific actuating means for positioning the strainer and screen elements, as well as for sealing the various valve components in fluid tight relationships. Other embodiments are directed to preferred structural arrangements for minimizing frictional wear between the various components of the present strainer and thus achieve ease of operation.

DESCRIPTION OF PREFERRED EMBODIMENT

The present straining device 10 comprises the strainer housing body portion 11 and the body inlet portion 12. These members are adapted for connection to each other in a fluid tight relationship, e.g. screwed, or flanged and bolted together as depicted in FIG. 1 of the drawings. The assembly 10 is preferably provided with the flanged portions 13 and 14 for mounting in-line in the conduit system 15.

Figure 2:
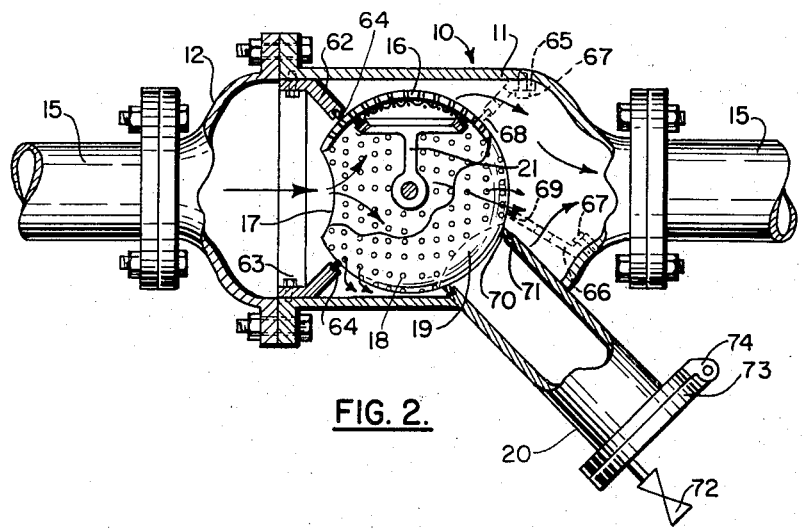
FIG. 2 represents a partial sectional side elevational view showing details of the internal arrangement of the various components of the present strainer device.

Referring to FIG. 2 in the drawings, the strainer body portion 11 is provided with the spherical or ball shaped strainer element 16 which is rotatably mounted within the strainer body portion 11 as discussed in greater detail hereinafter. The strainer element 16 is provided with the circular opening 17 which during normal operation, faces in an upstream direction as shown in FIG. 2 and pursuant to the mode of operation of the present strainer as explained in detail below. The strainer element 16 is provided with the multitude of perforations or apertures 18 which are sized as desired to perform the particular degree or efficiency of straining or filtration. These perforations are preferably provided over the entire peripheral spherical surface of the member 16 with the exception of the unperforated or solid portion 19 which functions as described hereinafter. This solid or nonforaminous portion is of a diameter sufficient to span or cover the debris discharge chamber portion 20 of the valve body portion 11. The size of the solid portion 19, the opening 17 and the swinging screen element 21 are sized to provide the cooperating relationship as explained hereinafter.

Figure 4:
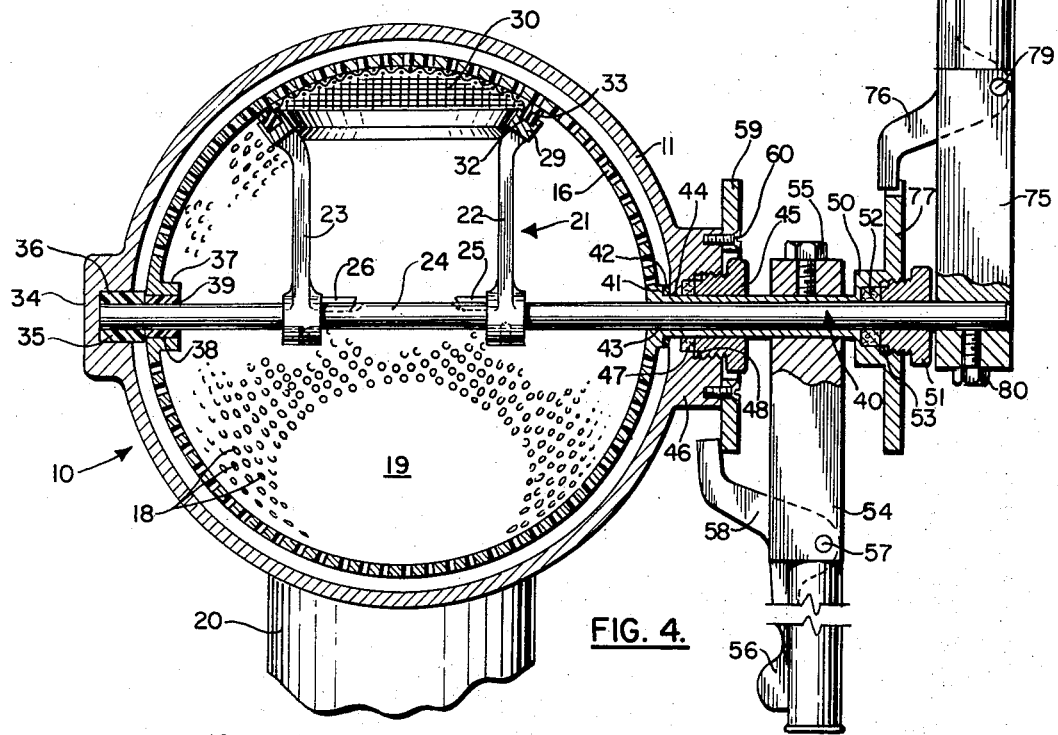
FIG. 4 represents a cross-sectional view taken along the line 4—4 of FIG. 1.

The swinging screen element 21 is rotatably mounted within the strainer element 16, as shown in detail in FIG. 4. The screen 21 further comprises the extended arm portions 22 and 23 which are rigidly affixed to the strainer pivot shaft 24. This is accomplished by boring the members 22 and 23 to receive the shaft 24 to which they are keyed by virtue of the keys 25 and 26 respectively. For ease in manufacture, the supporting members 22 and 23 are also provided with set screws 27 and 28 for preventing the screen assembly 21 from shifting laterally along the longitudinal axis of the shaft member 24. Of course, these members could be press fitted together, pinned, or the like to achieve the same results as long as the clearances between the strainer 16 and the screen assembly 21 are maintained as designed to prevent undue wear and avoid leakage between the members.

Figure 5:
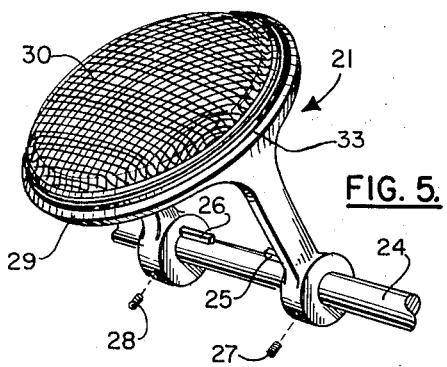
FIG. 5 represents an isolated isometric view of the swinging screen means shown in FIGS. 2 and 4.

The swinging screen assembly 21 further comprises the circular portion 29 upon which the screen or foraminous spherical shaped member 30 is affixed, e.g. by welding thereto, or the like. The porosity of the member 30 is selected so as to provide the retention of similar size particles as that provided by virtue of the apertures 18 in the strainer 16. As shown in FIGS. 4 and 5, the outer surface of the circular screen supporting portion 29 of the assembly 21 is provided with the groove 32 shaped to accommodate the resilient gasket member 33. The latter is preferably a channel or U-shaped rubber gasket glued or vulcanized to the member 21, confined within the groove 32.

It can be appreciated that other means can be employed for forming an essentially fluid type sealing relationship between the gasket 33 and the inner peripheral surface of the strainer 16, e.g. by the use of conventional felt, polytetrafluoroethylene, in short, any resilient material which will accommodate the tolerances between the members and not unduly abrade the material of construction of the strainer 16.

As brought out above, both the strainer assembly 16 and the screen assembly 21 are rotatably mounted within the valve body portion 11. Referring to FIG. 4 in the drawings, the valve body portion 11 is provided with the extended bearing housing portion 34 which is adapted to receive the sleeve member 35 which is adapted to fit within the bearing support hole 36 bored in the inner peripheral surface of the strainer case 11. The sleeve or bearing member 35 can be any bearing material suitable for withstanding the active corrosion effect of the liquid being handled, however, nonmetallic materials having a low coefficient of friction are preferred, e.g. nylon, polytetrafluoroethylene, or the like.

The strainer ball member 16 is provided with the extended portion 37 which in turn is bored at 38 to receive the sleeve member 39. The latter is also preferably composed of a low coefficient of friction material identical to that of the sleeve 35. The sleeve members 35 and 39 are in turn bored to receive the shaft member 24 which rotates therein.

The extended sleeve assembly 40 is provided for connection to actuating means positioned externally of the strainer 10 for operating the strainer ball 16 and swinging screen 21. The assembly 40 is connected to the extended hub portion 41 of the ball strainer 16. The thrust washer or spacer 42 is provided for minimizing wear between the hub portion 14 and the inner peripheral surface of the strainer body 11. The spacer 42 in cooperation with the hub portion 41 are sized to prevent lateral motion of the ball strainer element 16. The member 42 is preferably constructed of a similar material of construction as that of the sleeve members 35 and 39.

The strainer case 11 is bored at 44 to receive the sleeve assembly 40 and is provided with the extended portion 46 which is adapted to define a stuffing box to prevent fluid leakage along the annulus defined between the inner peripheral wall of the bore hole 44 and the outer peripheral surface of the sleeve assembly 40. Upon tightening the packing gland nut 45, the packing ram portion 48 thereof is caused to compress the resilient packing material 47 thereby causing it to expand outwards into contact with the outer peripheral surface of the sleeve assembly 40. The packing material 47 can be any suitable packing material, such as braided asbestos, chevron ring shaped polytetrafluoroethylene, or the like.

The sleeve assembly 40 is provided with the enlarged hub portion 50 which serves as a packing gland assembly in conjunction with the packing gland nut 51. The portion 50 is threadably adapted to receive the packing nut 51 and to receive the resilient packing material 52 which upon being compressed by the packing ram portion 53 of the nut 51 is expanded against the outer peripheral surface of the shaft 24. The shaft 24 is rotatably positioned in the bore hole 43 provided in the ball strainer 16 and sleeve assembly 40, leakage along which is prevented by virtue of the packing gland assembly provided in the hub 50.

The ball strainer element 16 is actuated by virtue of the handle assembly 54 which is rigidly attached to the sleeve assembly 40 by any suitable means, e.g. by the bolt 55 as shown in FIG. 4. The handle assembly 54 is provided with the latching mechanism 56 which is pivotedly mounted within the handle assembly 54 by virtue of the pin means 57. The extended portion 58 of the locking mechanism 56 is adapted to fit within selected slotted portions of the index plate 59 which is rigidly attached to the strainer case or body by virtue of the counter-sunk bolts 60. In FIG. 4, the handle assembly 54 is shown in a transient operational position for convenience of illustration as taken along the line 4—4 of FIG. 1. During normal operation, the extended portion 58 is reposed within one of the slots provided in the index plate 59 as shown and discussed in detail with reference to FIG. 1.

Referring to FIG. 2 in the drawings, the strainer body portion 11 is provided with the internal baffle assembly 62 positioned upstream of the strainer assembly 16. It can be bolted in the position by virtue of the bolts 63, welded in place, or the like. The baffle assembly 62 serves to divert fluid flow into the opening 17 provided in the strainer member 16. The baffle assembly 62 is conical shaped over its surfaces which project toward the strainer 16. The resilient sealing means 64 is provided for forming a fluid seal between the assembly 62 and the outer peripheral surface of the strainer 16. The downstream side of the strainer assembly 16 is stabilized by virtue of the spider support members 65 and 66 which are attached to the inside surface of the strainer body portion 11 by suitable means, e.g. the bolts 67. These members are likewise provided with the resilient sealing means 68 and 69 respectively so as to avoid wear between the members 65 and 66 and the strainer 16, similarly as in the case of the inward baffle 62. The resilient means 64, 68, and 69 can be any resilient material which would not unduly wear or abrade the surface of the strainer 16.

The chamber 21 projects within the strainer body portion 11 into juxtaposition with the strainer element 16 and is of a diameter such that the solid portion 19 of the strainer 16 entirely covers the inlet to the chamber 20. In the normal operating position shown in FIG. 2 of the drawings, fluid flow into the chamber 20 is prevented by virtue of sealing these members relative to each other by provision of the resilient sealing means 70 positioned over the end surface 71 of the member 20. As debris is collected in the discharge chute 20, pursuant to the manner of operation set forth hereinafter, the strainer is placed in the position depicted in FIG. 2 and pressure within the chamber 20 is bled off by virtue of the valve means 72 and the flanged assembly 73 swung open by virtue of the hinge assembly 74 and the debris thus removed from the chamber 20.

The ball strainer element 16 is in turn actuated in a similar fashion as the swinging screen assembly 21 by virtue of the handle assembly 75 as shown in detail in FIG. 4. The handle assembly 75 further comprises the extended portion 76 which is adapted to fit within selected slotted portions of the index plate portion 77 of the extended hub portion 50 of the sleeve assembly 40. The extended portion 76 constitutes part of the locking mechanism 78 which is pivotedly mounted within the handle assembly 75 by virtue of the pin means 79. The handle assembly 75 is bored to receive the end portion of the shaft 24 to which it is attached by some suitable means such as by the bolt 80.

By way of operation, FIG. 2 in the drawings depicts the normal position of the strainer assembly 16 and the swinging screen assembly 21. In such instance, the opening 17 is positioned in an upstream direction whereby fluid flow entering the inlet portion 12 of the strainer 10 is diverted inside the strainer 16 by virtue of the baffle assembly 62. The fluid thereby flows through the apertures or holes 18 in the strainer 16 into the chamber defined between the outside peripheral surface of the strainer 16 and the downstream strainer body portion 11 from which it exits from the strainer. In such manner, any solid particles entrapped in the fluid stream which are of a diameter greater than that of the apertures 18, are thereby retained within the strainer 16.

The normal flow condition discussed above with reference to FIG. 2 is further illustrated in the arrangement shown in FIG. 1 with regard to the position of the handle assemblies 54 and 75 which operate, respectively, the strainer element 16 and swinging screen element 21.

In the normal flow condition shown in FIG. 2, the solid portion 19 is in position over the inlet to the debris chamber 20. The resilient seal means 70 thereby effectuates a seal between the strainer element 16 and the edge 71 of the chamber 20 whereby fluid flow into the chamber is thus prevented during normal operation.

Figure 6A:
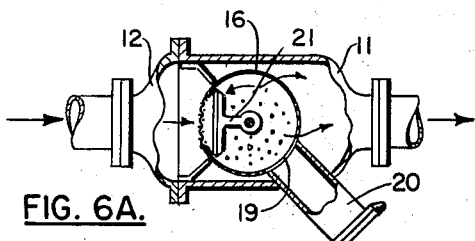
FIG. 6A through FIG. 6D depict the sequential operation of the present strainer device.

As debris is collected within the strainer 16, fluid flow through the strainer becomes more and more impeded, for example, as evidenced by a pressure drop across the strainer. At the desired point of flow obstruction, the swinging screen assembly 21 is moved into the position depicted in FIG. 6A. If desired, the swinging screen can be initially rotated through any number of revolutions to first free up the entrapped debris contained within the strainer element 16. In any event, the swinging screen 21 is finally placed into the position shown in FIG. 6A by manipulation of the handle 75 upon first depressing the latch mechanism 78 thereby removing the extended portion 76 thereof from within the index slot 82. The handle 75 is then rotated 90° counterclockwise (or 270° clockwise) to a position such that the extended portion 76 comes to rest within the index slot 83.

Figure 6B:
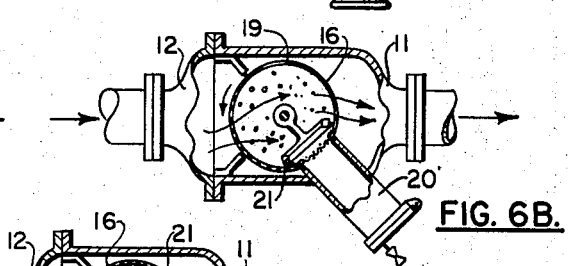

The entire strainer 16 and swinging screen assembly 21 is then rotated into the position shown in FIG. 6B. The entire strainer 16 and swinging screen assembly can be initially rotated through any number of revolutions to effect total backwashing with scrubbing prior to assuming the position in 6B. This is accomplished by manipulating the handle assembly 54 from its position shown in FIG. 1 to a position removed 135° counterclockwise, that is, along a line established by the longitudinal axis of the debris chamber 20. In such position, the extended portion 76 engages the slot 84 provided in the index plate 77. The throttle plate 59 is provided with an index slot (not shown) in the same position as the slot 83 in the index plate 77. In such manner, the throttle plate 59 being stationary, the operating lever 54 is thus held in the fixed position shown in FIG. 1 while simultaneously the lever 75 is held in that position as also shown during normal operation by virtue of the fact that the levers 54 and 75 can be maintained in a fixed spacial relationship by virtue of relationship established between the members by the index plate 77. In other words, the index plate 77 is rigidly affixed to the handle 54 which in turn can be rigidly positioned relative to the fixed throttle plate 59, so that the handle 75 can be likewise rigidly fixed relative to the entire assembly by virtue of the latching mechanism 78 which operates in conjunction with the index slots 82 and 83 provided in the index plate 77.

Figure 3:
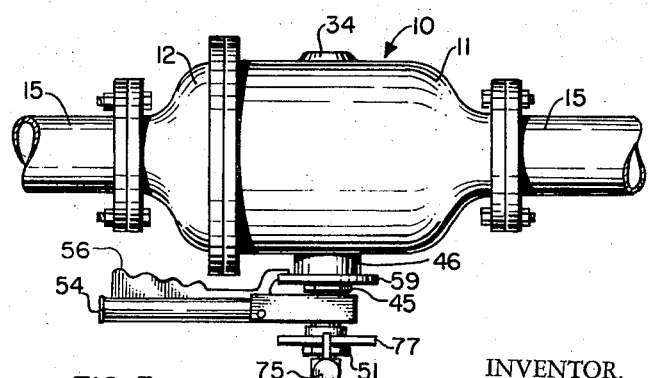
FIG. 3 illustrates a plan view of the present strainer.

Referring to FIG. 3, upon depressing the latching mechanism 56 which operates in a similar manner as the latching mechanism 78 of the handle 75, the handle 54 can thus be rotated from the normal operating position shown in FIGS. 1 and 2 to a position 135° removed therefrom whereby the opening 17, however covered by the swinging screen assembly 21, is placed in alignment with the debris chamber 20 as shown in FIG. 6B. During such operation, the fluid stream is still filtered whereby debris is collected on the outer peripheral surface of the screen 16 in the chamber defined between the outer surface of the screen 16, the baffle 62 and the upstream strainer body portion 12. During such interval of operation, the resilient sealing means 64 (see FIG. 2), serves to wipe the outer peripheral surface of the strainer 16 of debris as it collects thereon and thereby retain it within the before defined chamber.

Figure 6C:
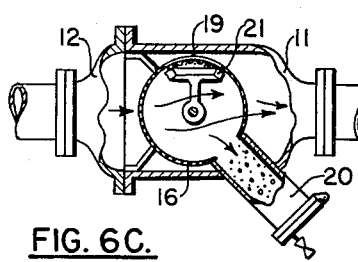

The swinging screen element 16 is then rotated from that position shown in FIG. 6B to the position shown in FIG. 6C whereby the debris is then allowed to collect in the chamber 20 as shown in FIG. 6C. At the end of the clean out phase, the swinging screen element 21 is then returned to the position shown in FIG. 6B which is 135° removed from its position shown in FIG. 6C. In the arrangement shown in FIG. 6B, of course, both the levers 54 and 75 would be aligned parallel and along the longitudinal axis of the chamber 20. The levers 54 and 75 would thus be held in such position by virtue of engaging the latching mechanism 56 of the lever 54 in the index slot 84 as shown in FIG. 1. In such position, the latching mechanism 56 of the lever 54 is engaged in the index slot 84 while simultaneously the latching mechanism 78 of the lever 75 is engaged in the index slot 83 of the rotatable index plate 77 which has been swung around into position in the before mentioned alignment. As brought out previously, this is accomplished by first moving the lever 75 90° counterclockwise, and thence moving the entire assembly 135° counterclockwise.

From the position shown in FIG. 6C, the swinging screen 21 is then preferably relocated back into alignment with the debris chamber 20 and the entire assembly rotated 135° clockwise to the position where the opening 17 faces upstream as shown in FIG. 2. Thereafter, the swinging screen element 21 is then rotated 90° further clockwise so as to also assume the position shown in FIG. 2.

Figure 6D:
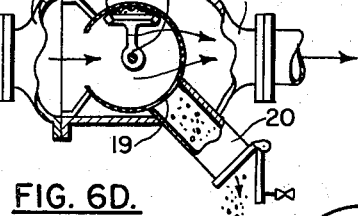

After the strainer is placed in the normal operating position shown in FIG. 6D which corresponds to that shown in FIG. 2, the valve means 72 can be opened and any pressure existing within the chamber 20 allowed to vent down to atmospheric pressure and the flange cover plate 73 unbolted whereby debris can be then removed from the chamber 20.

It can be appreciated by one skilled in the art that many different materials of construction can be employed in the fabrication of the present strainer without departing from the true scope and spirit of the present invention. The strainer body portions 11 and 12 are preferably constructed of cast iron or forged steel. The strainer 16 and the swinging screen 21 are preferably fabricated from materials which are corrosive resistant to most common fluids, e.g. brass, bronze, stainless steel, or the like.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. Liquid strainer means comprising:
    a. strainer main body means having at least an inlet port, an outlet port and a debris sump chamber portion having an outlet port in open communication with said main body means;
    b. ball shaped foraminous strainer means rotatably mounted within said main body means and having an open fluid inlet port constructed and arranged for fitting flush with the inlet port of said body means and with the outlet port of the sump chamber portion of said main body means;
    c. swinging screen means rotatably mounted flush within said strainer means and being of a size and configuration sufficient to close off the inlet port of said strainer means; and
    d. means for rotating said strainer and screen means.

2. The liquid strainer means of claim 1 further characterized in that:
    said strainer and swinging screen means are rotatably mounted within said strainer main body means whereby when said swinging screen means is operably positioned over the fluid inlet port of said strainer means, said means as an assembly can be rotated through any number of revolutions to effect total backwashing with scrubbing.

3. The liquid strainer means of claim 2 further characterized as comprising:
    d. resilient sealing means operably positioned between said strainer main body means and the fluid inlet port of said ball shaped foraminous strainer means so as to form a fluid tight relationship between said means and to wipe the outer peripheral surface of said strainer means when said means is rotated.

4. The liquid strainer means of claim 3 further characterized as comprising:
    e. baffle means operably positioned between said strainer main body means and said ball shaped foraminous strainer means and upon which said resilient sealing means are operably positioned in contact with said strainer means, said baffle means thereby serving to direct fluid flow into the fluid inlet port of said strainer means.

5. The liquid strainer means of claim 4 further characterized as comprising:
    f. means for actuating said strainer and screen means.

6. The liquid strainer means of claim 5 further characterized as comprising:
    g. resilient sealing means operably positioned between the outer peripheral surface of said strainer means and the inlet to said debris sump chamber portion of said strainer main body means.

7. The liquid strainer means of claim 6 further characterized in that:
    said strainer and screen actuating means is further defined as comprising a first actuating means operably attached to said strainer means whereby said strainer means can be rotated to any desired position, and a second actuating means operably connected to said screen means whereby said screen means can be operably rotated to any desired position within said strainer means.

8. The liquid strainer means of claim 7 further characterized in that:
    said first actuating means further comprises latching means;
    said strainer body means is further defined in that it is provided with a first index means permanently affixed to said body means; said first index means being provided with a first slot positioned in an upstream direction with which said latching means of said first actuating means is adapted to mate whereby said ball shaped foraminous strainer means can be rigidly positioned facing an upstream direction; said first index means also being provided with a second slot located essentially along the longitudinal axis of the debris sump chamber portion of said strainer main body means whereby upon aligning said ball shaped foraminous strainer means with said debris sump chamber portion for actuation of said first actuating means, the inlet to said ball shaped foraminous strainer means is rigidly fixed in alignment with said debris sump chamber portion whereby debris located in said ball shaped foraminous strainer means can be backwashed and debris collected in said debris sump chamber portion;
    said second actuating means further comprises latching means; and
    said strainer means is also further defined in that it is provided with a second index means rigidly attached thereto, said second index means being provided with a first slot located in a position such that said swinging screen means is maintained in a rigid position other than in alignment with the inlet to said ball shaped foraminous strainer means upon engagement of the latching mechanism of said second actuating means; said second index means also being provided with a second slot position in an upstream direction whereby upon engaging the latching mechanism of said second actuating means therein, said swinging screen means is rigidly fixed in a position covering the inlet to said ball shaped foraminous strainer means whereby said ball shaped foraminous strainer means can be rotated through any desired degrees of revolution to thereby effectuate backwashing and scrubbing of said ball shaped foraminous strainer means which is thereafter flushed of debris upon rotating said first actuating means and said second actuating means as an assembly to a position such that the inlet to said ball shaped strainer means is operably positioned over said debris sump chamber portion and whereafter said swinging screen means is rotatably moved out of position covering the inlet to said ball shaped foraminous ball strainer means whereupon debris is flushed from said ball shaped foraminous strainer means into said debris sump chamber portion.

* * * * *